United States Patent [19]

Tohjo

[11] Patent Number: 5,597,396
[45] Date of Patent: Jan. 28, 1997

[54] METHOD OF AND DEVICE FOR LUBRICATING MOLDS OF BOTTLE MAKING MACHINE

[75] Inventor: Kanehiro Tohjo, Nishinomiya, Japan

[73] Assignee: Yamamura Glass Co., Ltd., Hyogo-ken, Japan

[21] Appl. No.: 241,610

[22] Filed: May 11, 1994

[51] Int. Cl.$^6$ .................................................. C03B 40/027
[52] U.S. Cl. .......................... 65/169; 65/170; 65/160; 65/161
[58] Field of Search ............................ 65/169, 170, 160, 65/161, 26, 29.1, 29.12; 364/473; 184/19, 20, 25; 128/269

[56] References Cited

U.S. PATENT DOCUMENTS

| | | | |
|---|---|---|---|
| 1,843,160 | 2/1932 | Ingle | 65/169 |
| 3,480,422 | 11/1969 | Lichok | 65/169 |
| 3,523,016 | 8/1970 | Mattos | 65/170 |
| 3,721,542 | 3/1973 | Keller | 65/169 |
| 3,814,594 | 6/1974 | Mumford | 65/169 |
| 3,981,711 | 9/1976 | Bjorkstrom | 65/165 |
| 4,306,555 | 12/1981 | Ritter | 128/269 |
| 4,990,171 | 2/1991 | Kojima et al. | 65/169 |
| 5,266,093 | 11/1993 | Konishi et al. | 65/158 |

Primary Examiner—Donald E. Czaja
Assistant Examiner—Calvin Padgett
Attorney, Agent, or Firm—Price, Gess & Ubell

[57] ABSTRACT

A robot carries a swabbing member to a position of each mold to rub the swabbing member against each one of the molds. The swabbing member feeds a swabbing agent to the surface of each mold where it comes in contact with, and rubs the agent thereinto.

33 Claims, 7 Drawing Sheets

METHOD OF AND DEVICE FOR LUBRICATING MOLDS OF BOTTLE MAKING MACHINE

BACKGROUND OF THE INVENTION

1. Technical Field of the Invention

The present invention relates to a swabbing device for molds of a bottle making machine, and more particularly, to a swabbing device for molds which are made of various kinds of materials to be used for a bottle making machine wherein a multiplicity of bottle forming sections are aligned.

2. Description of Related Art

A bottle making machine is generally provided, for instance, with a blank mold and neck-ring mold for forming a parison which shapes a neck-ring portion and a body portion of a bottle, and a blow mold and bottom mold for finishing the parison formed by the blank mold and neck-ring mold, wherein a gob which is a melted lump of glass is fed into a bottle forming section.

The temperature of the gob which is fed to the blank mold and neck-ring mold ranges as high as 1070° C.–1150° C. when the gob is supplied, and it causes the gob to adhere to metal and other materials easily. The mold releasing operation can not, therefore, be performed smoothly when a bottle is formed by the molds as described above. There is a problem especially when the gob is formed into a shape with the blank mold and neck-ring mold under high temperature.

In order to cope with such a difficulty, it has heretofore been practiced to manually swab the blank mold, neck-ring mold and a baffle with a swabbing agent periodically. In the case of a blank mold, for instance, it is desired to perform a swabbing operation at intervals of 10–20 minutes.

On the other hand, with a view to eliminate said manual swabbing operation or to prolong the intervals necessary for a swabbing operation, it has been practiced to spray a mold releasing agent automatically, or to adhere a mold releasing agent to the surface of a mold by baking, or to provide a dried precoated layer, or to adhere soot produced out of incomplete combustion of acetylene to a metal mold.

When a mold releasing agent is applied manually, oil adheres closely to the surface of a mold forming an oil film thereon to achieve satisfactory mold releasing. However, said manual application has to be conducted frequently under a noise and high temperature which eventually requires time and much labor. It is, therefore, desired to curtail the frequency of operation for application.

It is also dangerous when the manual application is conducted to a mold which is frequently opened and closed (for instance, at an interval of less than two seconds). For this reason, such a swabbing operation is closely observed by the Labor Standards Inspection Office and other competent institutions. Heretofore, a forming operation has been conducted at a speed of around six shots per minute. However, with the recent high-speed operation, the speed has increased more than 2.5 times. Under the circumstances, in the case when a forming operation exceeds 14 or 15 shots per minute, it is practiced to interrupt the forming operation during a swabbing operation in order to prevent the danger which adversely affect the productivity.

When a swabbing operation is performed by means of spray, only a particle of oil is put on the surface of a mold and it is likely to be removed by a particle of glass easily. The swabbing effect thus remains short, about half of the life as compared with the case of said manual swabbing operation. A swabbing operation should, therefore, be conducted at a short cycle, i.e. at intervals of 5–10 minutes. A supplementary operation by a manual swabbing is thus required to increase the duration of intervals.

There is another difficulty that an application can not be fully conducted all over the surface of a mold thus inviting partial checking and insufficient formation by stains. Further, on some occasion, a swabbing is done onto unnecessary portion of a mold to cause insufficient exhaustion thereat which adversely affect a forming effect. The surface of a product is thus made rough, and the product is easily stained compared with a product manufactured by the manual swabbing. For this reason, the appearance of a product can not be formed satisfactorily.

Moreover, a precoated layer is dissipated by itself, since it will evaporate as carbon dioxide when a hot gob fed to a mold comes in contact with the layer. The precoated layer is thus reduced every time when a forming operation is conducted, and the life of the layer expires in two-six hours. The life appears to be longer as compared with that of the case of the manual swabbing, however, said reduced precoated layer can not be replenished by a supplementary operation. It is, therefore, necessary to change a mold every time when the life of the precoated layer is expired by the reduction of the layer. The cycle for exchanging a mold is, therefore, short which causes a raise in manufacturing cost and lowers the productivity.

In the case of a treatment where an Alblack, which is a soot being sold on the market, is used, acetylene generates an intense heat with oxygen so that operation efficiency is lowered and an environment is worsen. Further, the bottom thickness of a product is excessively thickened, and it sometimes necessitates to change the design of a mold.

SUMMARY OF THE INVENTION

It is a primary object of the present invention to provide a swabbing device for molds of a bottle making machine which is capable of automatically performing a mold swabbing operation just like the case of a manual swabbing whereby the danger in the manual swabbing is prevented with elimination or reduction of labor, and fulfilling a rapid and precise swabbing operation in a high-speed forming operation thus improving the quality of a product and the productivity.

It is another object of the present invention to provide a swabbing device for molds of a bottle making machine which is capable of lowering manufacturing cost, and at the same time, accomplishing high efficiency wherein the whole body of a robot is moved to a location of a mold provided in each one of bottle forming sections to rapidly carry a swabbing member, and with a simple robotic action of swabbing onto a mold, the robot is able to swab all the molds provided in each section.

It is a further object of the present invention to provide a swabbing device for molds of a bottle making machine which is capable of fulfilling a precise swabbing operation at a low cost wherein a specified swabbing location of a robot corresponding to each one of the molds is adequately discriminated with a simple procedure to precisely perform an automatic swabbing operation by the robot at a proper location as predetermined.

It is a still further object of the present invention to provide a swabbing device for molds of bottle making machine which is capable of preventing a lowering of bottle manufacturing efficiency without adversely affecting a regular bottle manufacturing cycle, and eliminating or lessening a timing loss which is caused by a swabbing operation.

A further object of the present invention is to provide a swabbing device for molds of a bottle making machine which is capable of accomplishing a satisfactory swabbing operation which compares favorably with a manual swabbing operation wherein an impregnated material such as cloth and string are provided around a core member, and a swabbing agent is impregnated into the impregnated material for a swabbing operation.

These and other objects and features of the present invention will become more apparent from the following description taken in conjunction with the accompanying drawings which illustrate specific embodiments of the invention.

DESCRIPTION OF THE PREFERRED EMBODIMENTS

Referring to accompanying drawings, description will now be made hereinafter on embodiments of a bottle making machine to which the present invention is applied.

Figure 1:
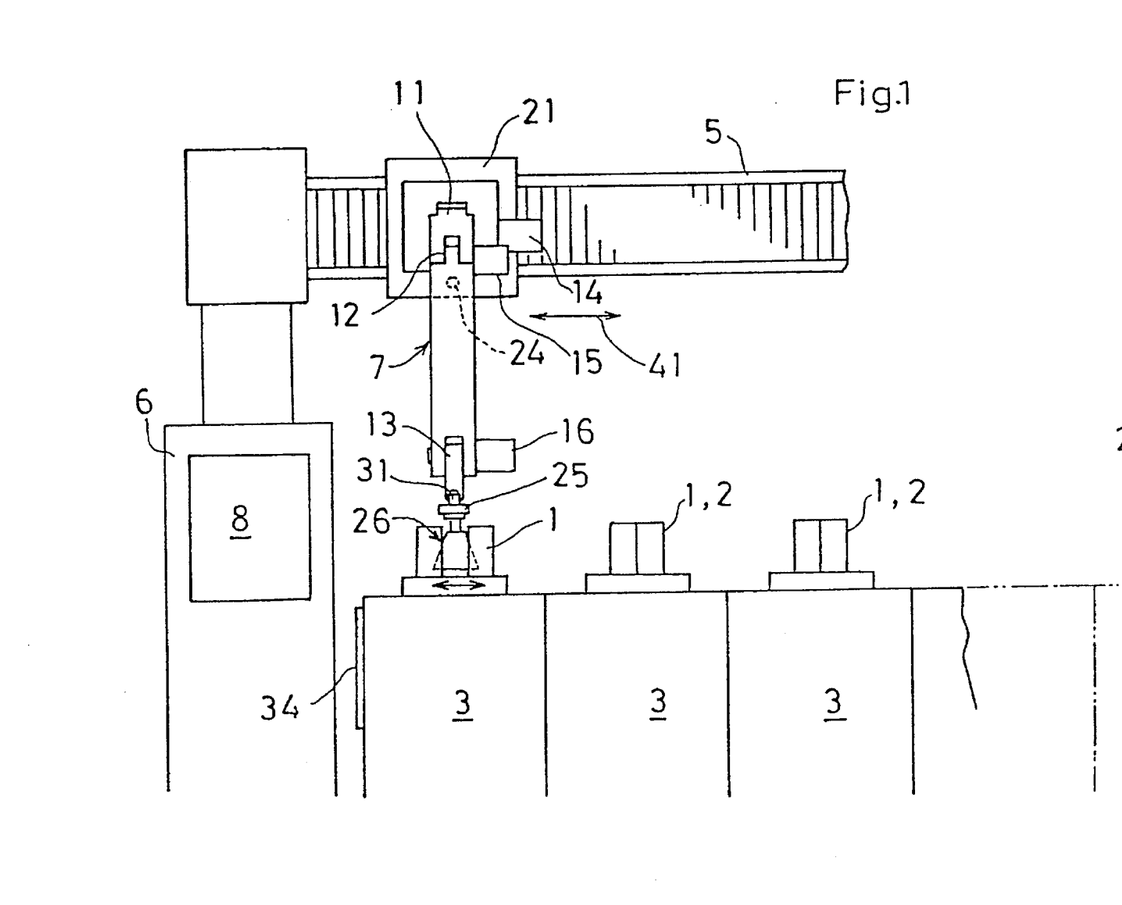
FIG. 1 is a front view roughly showing a part of bottle making machine to which the present invention is applied.
Figure 2:
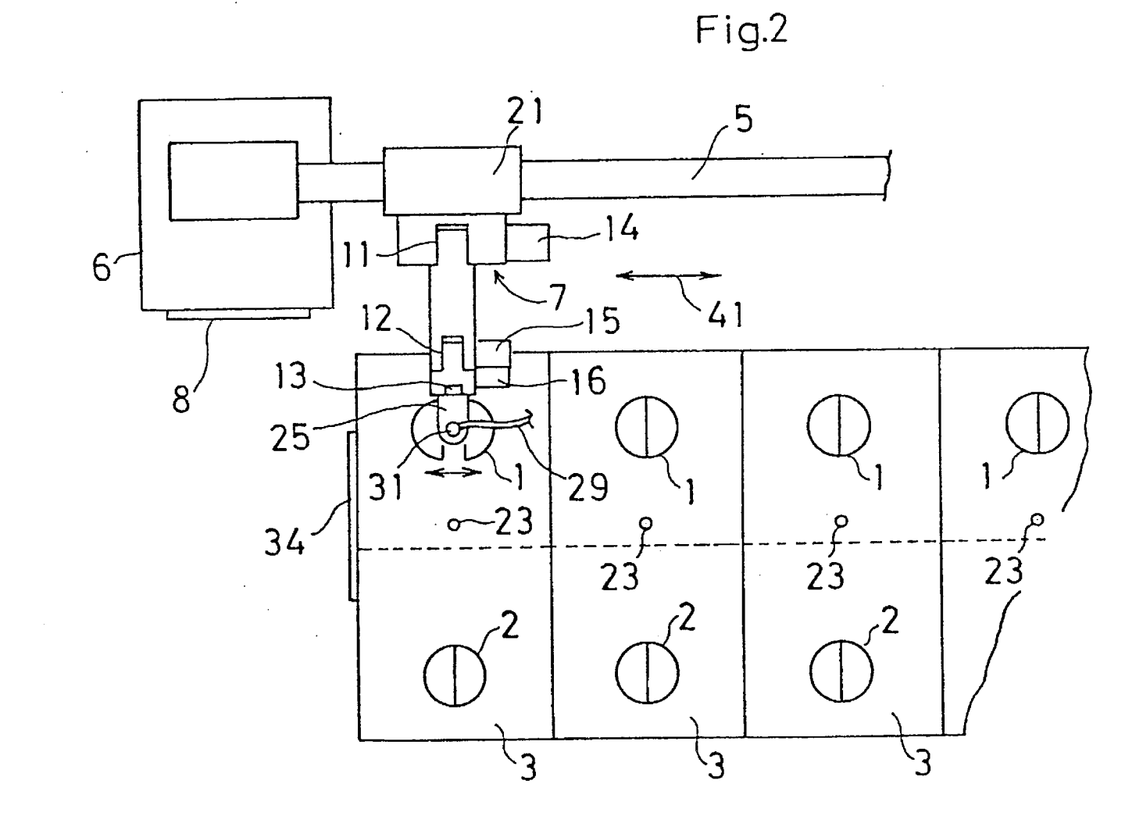
FIG. 2 is a plan view showing a part of the bottle making machine shown in FIG. 1.
Figure 4:
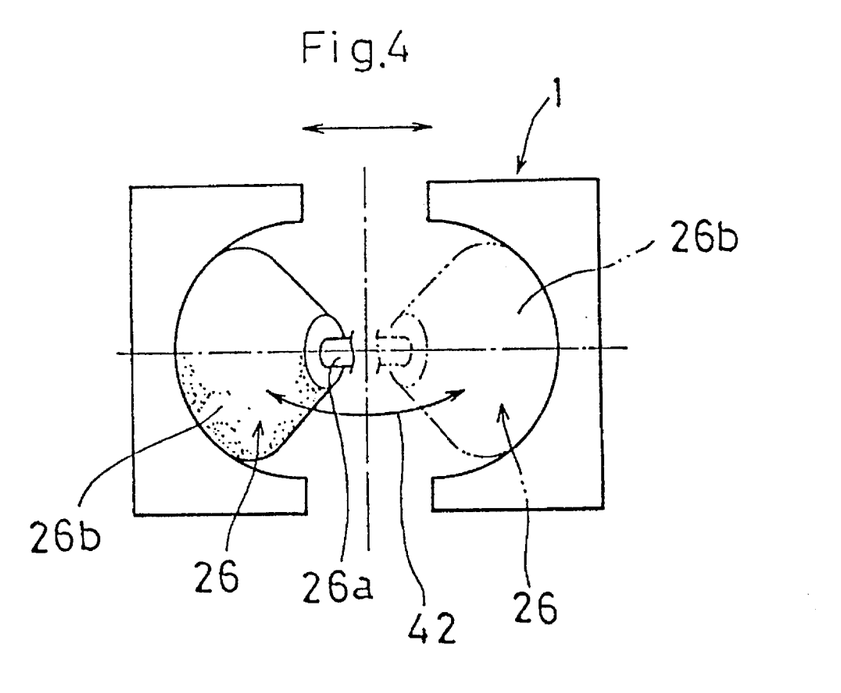
FIG. 4 is a plan view showing a condition how a blank mold is opened.

In the bottle making machine of the present embodiment, there are provided bottle forming sections 3, for instance, 6–12 sections, laterally aligned as shown in FIGS. 1 and 2 wherein a blank mold 1 combined with an unillustrated neck-ring mold and a baffle, and a blow mold 2 combined with an unillustrated bottom mold are arranged. As shown in FIGS. 1, 2 and 4, the blank mold 1 is arranged to be automatically opened and closed right and left by an unillustrated air cylinder or the like in parallel movement. It may also be arranged to be rotatably opened and closed centering around a hinge.

The blank mold 1 is combined with a neck-ring mold at the lower portion and a baffle at the upper portion, and through a delivery mechanism, a gob which is a melted lump of glass prepared for bottle manufacturing is fed into each one of blank molds 1 in a predetermined order. The blank mold 1 then forms the neck-ring portion of a bottle, and the body and bottom portions of the bottle are shaped to form a parison.

The parison which is formed in the blank mold 1 is transferred to the blow mold 2 to be formed into a predetermined shape of bottle.

A timing for feeding the gob to each one of the blank molds 1 is set for subsequently repeating operations of rough formation of a bottle by the blank mold 1 at each one of bottle forming sections 3, and subsequent finishing formation of the bottle by the blow mold 2 at regular intervals.

At a side of the bottle making machine, a straight guide 5 is provided along a direction the bottle forming sections 3 are aligned, and both ends are held by a leg member 6. To the straight guide 5, the base 21 of a robot 7 is slidably held to be driven in reciprocating motion along the straight guide 5 by a linear motor 51 provided between the straight guide 5 and base 21.

The linear motor 51 consists of, for instance, a permanent magnet 51a on the base 21 and an electromagnet 51b on the side of the straight guide 5. However, in place of the linear motor 51, an AC servomotor may also be utilized.

On one of the leg members 6, there is provided an operation box 8 for giving instructions to control actions of the robot 7.

The robot 7 in the present embodiment is arranged to be easily and rapidly moved to a location opposite to a blank mold 1 provided in each one of the bottle forming sections 3 without resorting to any robotic action by the movement along the straight guide 5 so that any device which possesses a function to perform a swabbing action to a mold within a necessary range of action may be utilized when a swabbing operation is performed for the blank mold 1, and the neck-ring mold and the baffle combined therewith.

Figure 3:
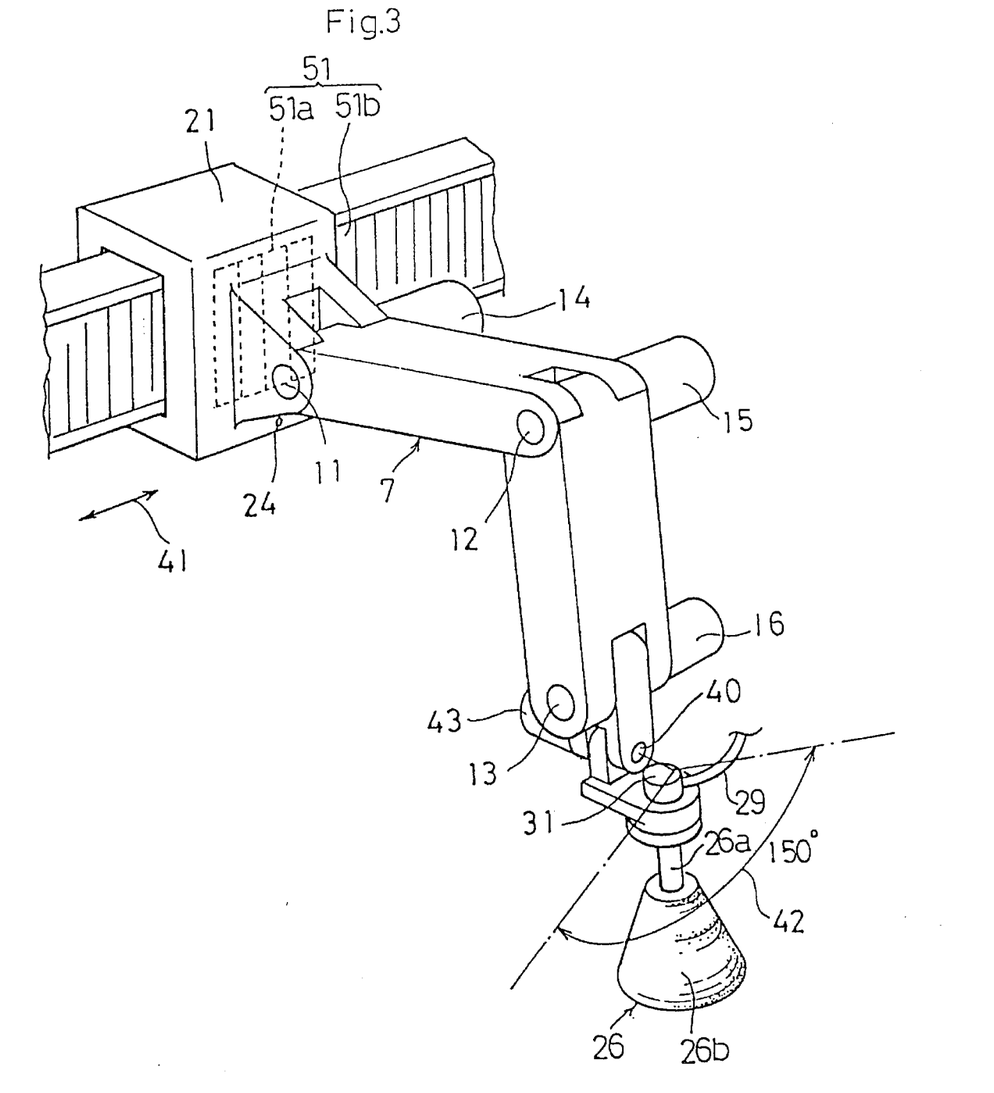
FIG. 3 is a perspective view showing a robot provided with the bottle making machine shown in FIG. 1.

As illustrated in detail, the one shown in the FIG. 3 is a simple joint type provided with four joints of first to fourth joints 11–13 and 40 whereby a straight reciprocating movement of the robot 7 in a direction shown by an arrow 41 in FIGS. 1 and 2, a rotating action around the first, second and third joints 11–13, an action of the swing of the pendulum around the fourth joint 40 as shown by an arrow 42 in the FIGS. 3 and 4, and various actions in which said actions are combined can be performed. A swabbing member 26 can thus be rubbed over a necessary range of the surface of various metal molds.

Not limiting to such an arrangement as described above, six-joints type robot, seven-joints type robot or the like provided with a rotating shaft which rotates in various directions may selectively be utilized according to a requirement. The reciprocating movement or other arrangement may also be selectively adopted according to a requirement. Not only the action of the swing of the pendulum of the swabbing member 26, it may also be arranged to rotate it on its own axis, or to rotate it in an orbital motion, or to move it vertically.

The robot 7 is provided with motors 14–16, 43 for each one of the first-fourth joints 11–13, 40 for its rotating action around the joints (refer to FIG. 3), and through the base 21 which is slidably fitted and held to a straight guide 5, signals are delivered and received between a microcomputer 22 in the operation box 8 to control a reciprocating movement along the straight guide 5, and rotating actions around said first-third joints 11–13. An AC servomotor, stepping motor or the like may selectively be utilized for the motors 14–16 according to a method of control which is to be applied.

The microcomputer 22 controls the robot 7 to perform a swabbing operation correlatively with bottle making action of the bottle making machine in each one of the bottle forming sections 3. The microcomputer 22 is, therefore, arranged to deliver and receive signals between a microcomputer 32 which controls actions of the bottle making machine.

The position of movement of the robot 7 along the straight guide 5 may be measured from the amount of movement by setting a home position of the robot 7.

In the present embodiment, a position indication 23 is provided in each one of the bottle forming sections 3 corresponding to a central position in a longitudinal direction of the straight guide 5, and a position sensor 24 is provided at the lower front center of the base 21 of the robot 7. The position sensor 24 detects the position indication 23 when the sensor 24 is positioned opposite to the position indication 23 in a direction perpendicular to the longitudinal direction of the straight guide 5, and by a signal of the detection, the microcomputer 22 makes a judgment that the center of the blank mold 1 which is positioned opposite to the position sensor 24 and the center of the robot 7 are opposite to each other (refer to FIGS. 1–3).

An ultrasonic sensor, laser sensor or the like may be utilized in place of the position indication 23 and position sensor 24. A device which is arranged to mechanically detect a position may also be adopted.

A chuck 25 is provided at the tip of the robot 7 to removably attach the swabbing member 26 for performing a swabbing operation to the blank mold 1. Adjacent to the bottle making machine, there is provided a stacker 27 for storing various kinds of swabbing members 26. The robot 7 is thus able to selectively use one of the swabbing members stored in the stacker 27 corresponding to a required mold and swabbing condition.

For the selective use of the swabbing member 26, the stacker 27 is provided with a position indication 28 at a location where each kind of swabbing members 26 is stored as shown in FIG. 2. By detecting the position indication 28 with the position sensor 24, the microcomputer 22 makes a judgment that the robot 7 is positioned at a proper location opposite to a location where each swabbing member 26 is stored.

As shown in FIGS. 2 and 3, a swabbing agent supply pipe line 29 is connected with the chuck 25 for feeding a swabbing agent to a swabbing member 26 which is attached thereto. The swabbing member 26 is provided with an impregnated material 26b such as cloth and string around its core member 26a as shown in FIGS. 1, 4, 5 and 6. The swabbing member 26 may, therefore, be manufactured in any shape according to a requirement to be stored in the stacker 27.

Figure 5:
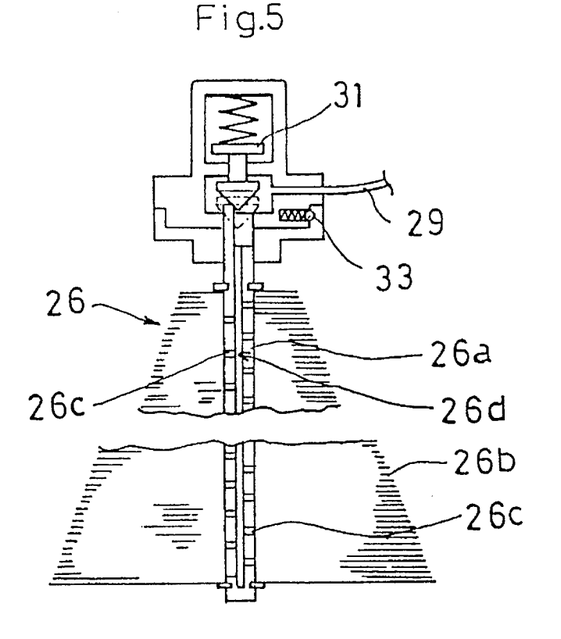
FIG. 5 is a sectional view showing a part of a kind of swabbing member.
Figure 6:
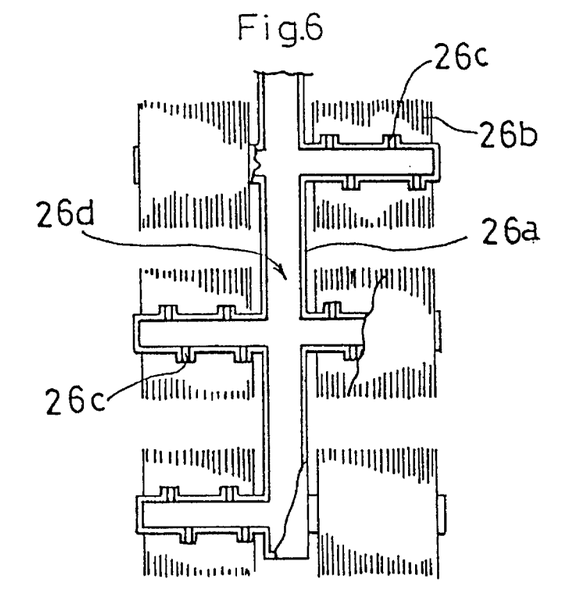
FIG. 6 is a sectional view showing a part of another kind of swabbing member.

In the core member 26a, there is provided a liquid passing path 26d which vertically runs through from the upper end to the lower end. The liquid passing path 26d is provided with openings 26c to the surface of the core member 26a where the impregnated material 26b is attached, and a swabbing agent fed through the swabbing agent supply pipe line 29 is forwarded to the liquid passing path 26d in the core member 26a through a check valve 31 provided with the chuck 25. Through the openings 26c, the swabbing agent spontaneously permeates into the impregnated material 26b around the core member 26a by the capillarity. Accordingly, when the swabbing member 26 is rubbed against the surface of blank mold 1, the swabbing agent impregnated in the impregnated material 26b is applied all over the surface of the metal mold like the case of the manual swabbing whereby elimination or reduction of labor may be accomplished.

There is no danger which might occur in a manual swabbing operation. Since a rapid and precise swabbing operation can be performed based on a condition preliminarily set, a swabbing may be conducted at a speed of around 16–20 shots per minute, and the quality of product and the productivity are improved.

The check valve 31 is arranged not to leak a swabbing agent which is fed to the chuck 25 when the swabbing member 26 is removed from the chuck 25. Since a swabbing agent is fed to the swabbing member 26 in spontaneous permeation from within the core member 26a to the impregnated material 26b, supply pressure of the swabbing agent through the swabbing agent supply pipe line 29 may be set, for instance, at a small pressure of 1–2 kg/cm$^2$ G. Even when a supply pressure is given by pump, a spontaneous flow of the swabbing agent is prevented without the check valve since the pump is stopped when a swabbing operation is not performed.

By making an arrangement to impregnate a swabbing agent into an impregnated material 26b from within the core member 26a, impregnation can be accomplished by forcibly feeding the swabbing agent through the core member 26a whenever and wherever the swabbing member 26 is positioned.

The chuck 25 is also provided with a click stopper 33 for elastically locking a swabbing member 26 in order to remove the attached swabbing member 26 with a proper amount of force. However, any type of locking means may be adopted. For instance, it may be arranged to lock and remove the swabbing member 26 by relative movement of the chuck 25 of robot 7 and the swabbing member 26 stored in the stacker 27.

Figure 7:
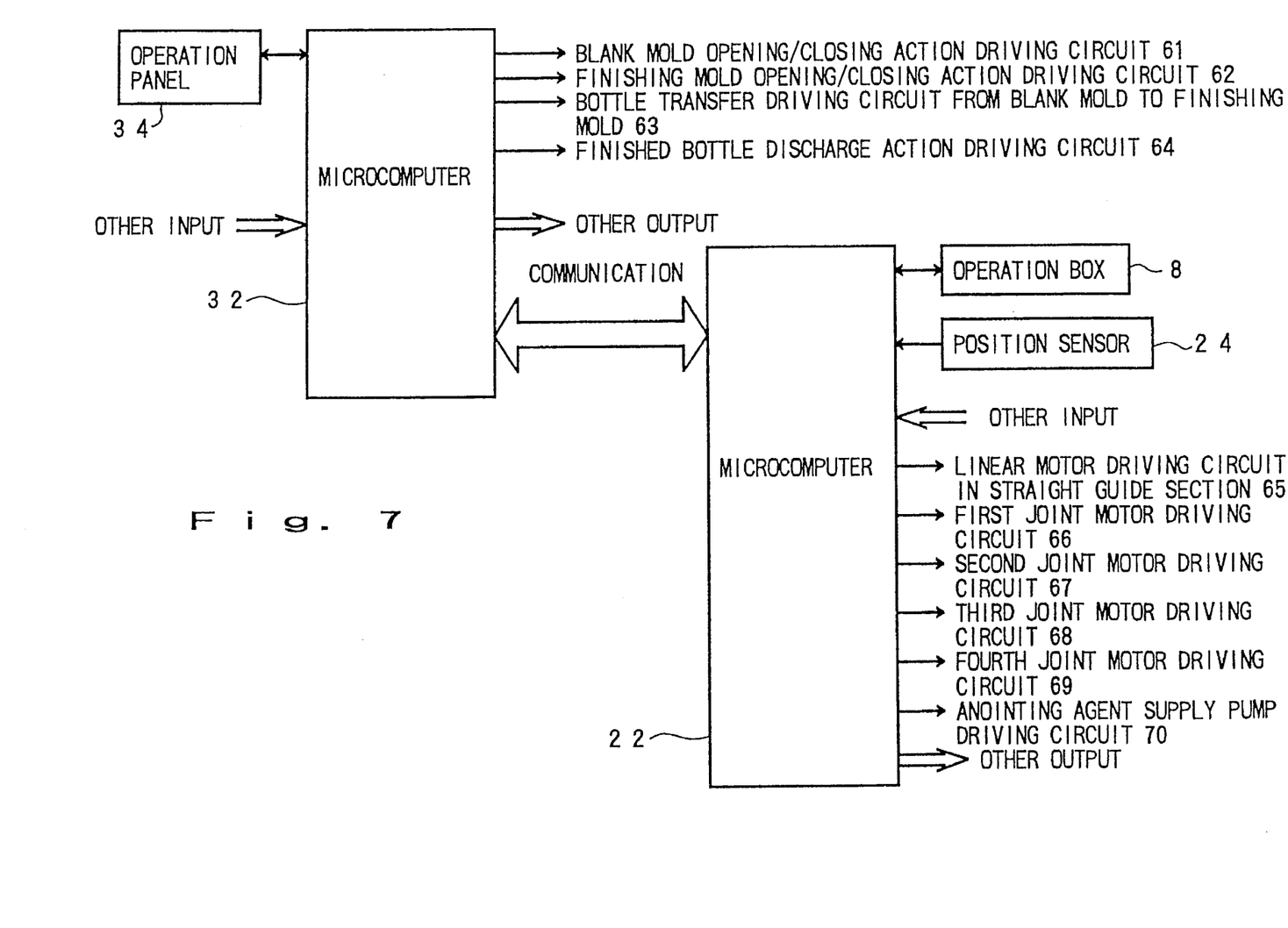
FIG. 7 is a block diagram showing a control circuit of the robot and bottle making machine.

FIG. 7 is a block diagram showing a control circuit for controlling actions of the bottle making machine and robot 7 by utilizing the microcomputers 22 and 32. In the present embodiment, the microcomputer 22 adopts a numerical control system for the robot 7, however, any type of control system such as a playback system or the like may be adopted according to a requirement.

The operation box 8 is connected with the microcomputer 22 for giving instructions of numerical control. It is also arranged to indicate confirmation of various operating conditions.

To an output side of the microcomputer 22, there are connected a linear motor driving circuit 65 in the straight guide section, first-fourth joints motor driving circuits 66–69 for driving each one of the motors 14–16, 43, and a swabbing agent supply pump driving circuit 70 for performing various operations. The position sensor 24 and other input are connected to an input side for properly performing said actions.

To an input side of the microcomputer 32, an operation panel 34 is connected for inputting various conditions in a bottle manufacturing process, and for indicating confirmation of various actions. Other input of various sensors is also connected for controlling various actions.

To an output side of the microcomputer 32, there are connected a blank mold opening/closing action driving circuit 61, blow mold opening/closing action driving circuit 62, bottle transfer driving circuit 63 from a blank mold 1 to a blow mold 2, finished bottle discharge action driving circuit 64, and other output.

With the arrangement as described above, the robot 7 is moved to and stopped at each position where the blank mold 1 provided in each one of the bottle forming sections 3 and the center of the robot 7 correspond with each other, and at each position where the swabbing member 26 stored in the stacker 27 and the center of the robot 7 correspond with each other.

With a necessary swabbing member 26 installed, the robot 7 is moved to a location where each one of the blank molds 1 is positioned, and rubs against each blank mold 1 as shown in the FIG. 4 to accomplish a swabbing operation in the same action as in a manual swabbing operation.

According to the experiments conducted by the inventor, it was found that the production of satisfactory bottles in the blank mold and neck-ring mold can only last for about an hour in the case of a swabbing by an automatic spray method. When a production time has exceeded one hour, there occurred such defects as wash board, wrinkles and laps, chilling, and insufficient feeding of gob into the blank mold. In the neck-ring mold, such defects as screw check, body seam check and the like were observed.

On the contrary, in the case of a swabbing performed by the robot 7 in the present embodiment, the production of satisfactory bottles in the blank mold continued for about eight hours, and about six hours in the neck-ring mold respectively.

When an automatic swabbing operation is conducted by the robot 7 in the present embodiment using a super hard alloyed material composed of Cu, Co, Ni and W (Item No. KRC-15 manufactured by Kobe Steel Co., Ltd.) which is treated by composite metal plating (Ni+P+SiC, Ni+P+W) for the neck-ring mold, the generation of defective checks and the like were restrained covering a shortage of swabbing agent. In sum, a forming capability is further improved when an alloyed material composed of Ni, Co, Cu and W which does not wet so easily is used in manufacturing metal molds.

A metal mold is applied to the present embodiment, however, any mold which is made of other materials other than metal may also be applied.

In the present invention, it may be arranged to provide a swabbing agent supply source such as a swabbing agent storage chamber for feeding a swabbing agent to the swabbing member, and by moving the swabbing member to the swabbing agent supply source by the robot, the swabbing agent is impregnated when they come in contact with each other. In this case, by making use of intervals between swabbing operations, or by making use of the time when the swabbing member is stored in the stacker, it may be arranged to impregnate the swabbing member by dipping it in the swabbing agent storage chamber.

Figure 8:
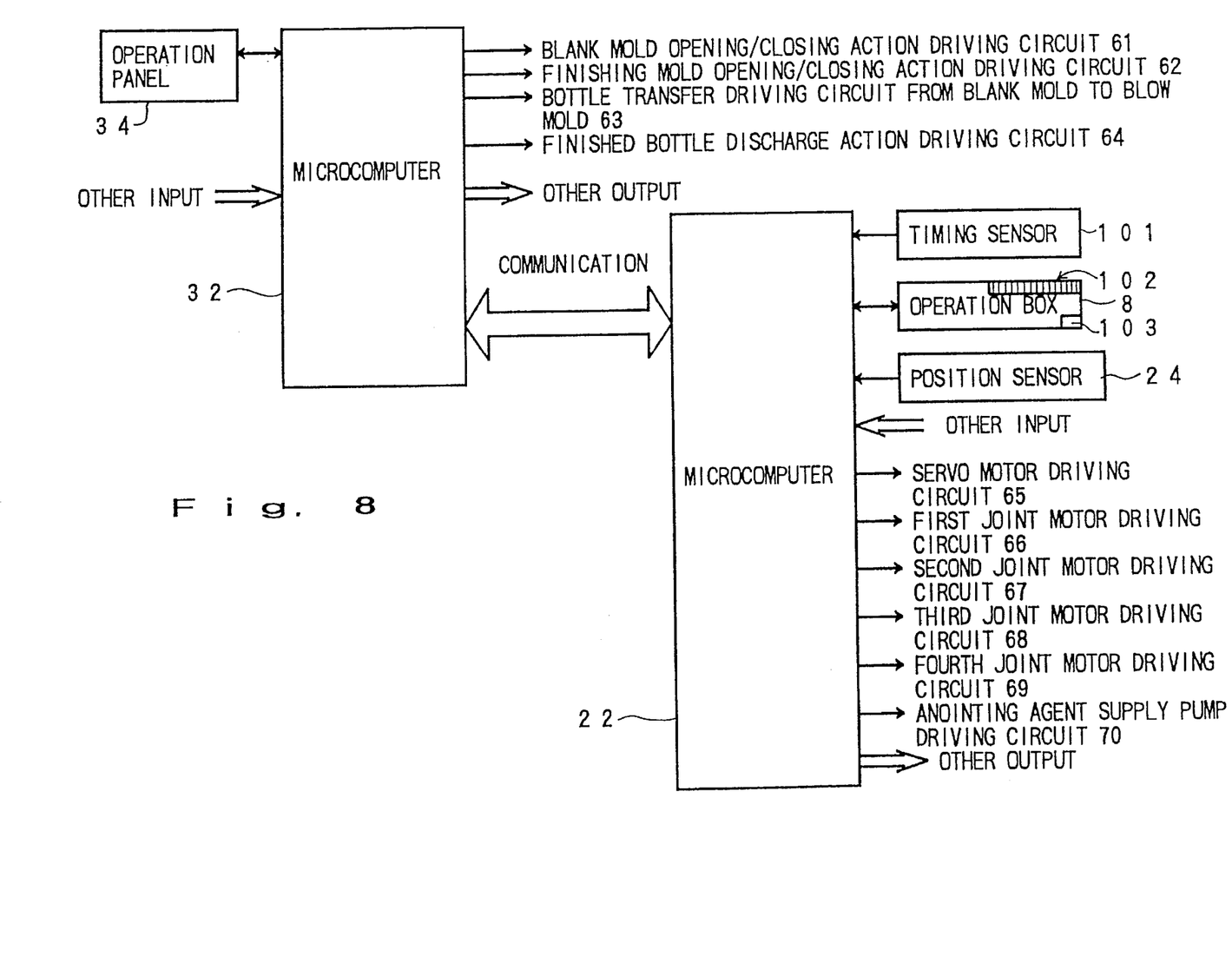
FIG. 8 is a block diagram showing a control circuit of the robot and bottle making machine in another embodiment.

FIG. 8 shows another embodiment of the present invention which differs from the previous embodiment on the points that an order of movement of the robot to each one of the molds in the bottle forming sections for a swabbing operation is predetermined, and that when there is a defective mold, the robot is voluntarily moved to such a mold. Further, the straight movement of the robot is made by a servomotor which utilizes a fluid such as air.

Description will now be made on the points of difference referring to the FIG. 8. Like parts and circuits are shown by corresponding reference characters throughout the views of drawings, and repeated descriptions will be omitted.

When the robot is controlled by the microcomputer 22, if there is not any defect in a product being manufactured such as wrinkles and laps, wash board, screw check and the like, the robot which is positioned at a home position is moved in consecutive order from one end to another in the sections aligned, i.e. from a small numbered section to a large numbered section assuming that each section is numbered starting from a home position of the robot. When a mold positioned opposite to the robot is opened and empty, the robot is stopped thereat for a swabbing operation, and each time a swabbing operation is completed, the robot is moved to the next section. When a swabbing operation is finished at the last section, the robot is returned to the home position to be ready for the next swabbing operation.

A servomotor driving circuit 165 is, therefore, connected to the microcomputer 22 for the straight movement of the robot. By adopting a servomotor, particularly an air servomotor, a straight movement mechanism may be provided at a low cost. Further, a position of the robot where it is moved can be found simply by an encoder, and a position control can be easily conducted. There may occur an error of 2 mm or so for the position control, however, it does not matter particularly.

An interval for moving the robot may be optionally set by an inputting means provided in the operation box 8. In the present embodiment, it can be set within a range of 0–60 minutes. At present, the setting is selectively made at intervals of 5, 10, 15, 20 minutes corresponding to a product forming condition. The timing when a mold in each section is opened and become empty is detected by a timing sensor 101 which is connected to the microcomputer 22, and based on a detection signal, a required time is obtained from the time a mold in each forming section is opened after a forming operation is completed until the mold is emptied.

When operator judges that there occurred such defects as wrinkles and laps, wash board, screw check and the like in a product being manufactured in one of the forming sections, the operator specify the section from a group of keys 102 provided on the operation box 8. The robot is thus moved to the specified section preferentially voluntarily by an interruption control. When the preferential swabbing operation is completed at the specified section, the operation is returned to an ordinary mode of control for movement.

When a plurality of specified sections are set, for instance, the preferential swabbing operation may be conducted in order of setting which has been set. Other order may also be selected.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A swabbing device for molds of a bottle making machine, comprising:

a swabbing member for supplying the surface of a mold with a swabbing agent, the swabbing member made of an absorbent material provided around a core member for supplying the surface of a mold with a preliminarily impregnated swabbing agent by being rubbed against the surface of the mold;

a multijoint robot having a robotic arm with four or more joints which traverses above a plurality of bottle forming sections for carrying said swabbing member to a position adjacent each of the molds and performing an automatic swabbing operation at each section wherein each joint is capable of a pivoting and a rotational movement independent of, and concurrent with, the other joints;

a plurality of motors for separately driving each of the joints of the robotic arm; and a controller for separately controlling the activation of each motor to drive the swabbing member relative to each mold to a position within a mold, to press the swabbing member against the surface of the mold, and to move the swabbing member along the surface.

2. A swabbing device for molds of the bottle making machine as claimed in claim 1, wherein said swabbing member is made of cloth or string provided around a core member for absorbing a swabbing agent.

3. A swabbing device for molds of the bottle making machine as claimed in claim 1, wherein the whole body of said multijoint robot is arranged to move in a reciprocating motion in a direction bottle forming sections are aligned, and is stopped at a predetermined swabbing position.

4. A swabbing device for molds of the bottle making machine as claimed in claim 3, wherein said multijoint robot is driven in a reciprocating motion along a straight guide.

5. A swabbing device for molds of the bottle making machine as claimed in claim 4, wherein the movement of multijoint robot in the reciprocating motion is performed by a linear motor.

6. A swabbing device for molds of the bottle making machine as claimed in claim 4, wherein the movement of multijoint robot in the reciprocating motion is performed by a servomotor.

7. A swabbing device for molds of the bottle making machine as claimed in claim 3, further comprising:

a position detector for detecting a position where the multijoint robot is at present; and a controller for judging a swabbing position of the multijoint robot against each mold based on the result of a detection made by the position detector, and stopping the multijoint robot at the swabbing position corresponding to each mold for performing a swabbing operation.

8. A swabbing device for molds of a bottle making machine, comprising:

a swabbing member made of an absorbent material provided around a core member for supplying the surface of a mold with a preliminarily impregnated swabbing agent by being rubbed against the surface of the mold;

a multijoint robot with four or more joints which traverses above a plurality of bottle forming sections for carrying said swabbing member to a position adjacent each of the molds and performing an automatic swabbing operation at each section, wherein the multijoint robot is arranged to move in a reciprocating motion across the bottle forming sections and can be stopped at predetermined positions;

a position detector for detecting a position where the multijoint robot is at present;

a controller for judging a swabbing position of the multijoint robot against each mold based on the result of a detection made by the position detector, and stopping the multijoint robot at the swabbing position corresponding to each mold for performing a swabbing operation; and a swabbing agent supply means which operates in combination with the multijoint robot for feeding a swabbing agent to the surface of a mold.

9. A swabbing device for molds of the bottle making machine as claimed in claim 8, wherein said controller controls a swabbing operation in compliance with a predetermined order of the bottle forming sections.

10. A swabbing device for molds of the bottle making machine as claimed in claim 8, wherein the controller controls a swabbing operation in compliance with an order the bottle forming sections are aligned.

11. A swabbing device for molds of the bottle making machine as claimed in claim 10, further comprising input means for designating a specific bottle forming section, and the controller controls to preferentially perform a swabbing operation in a specified bottle forming section upon receiving input from the input means.

12. A swabbing device for molds of the bottle making machine as claimed in claim 1, further comprising:

a plurality of swabbing members, each member having a different shape for applying a swabbing agent by making contact with a mold, and a controller for controlling said multijoint robot to selectively exchange the plurality of swabbing members according to a requirement.

13. A swabbing device for molds of a bottle making machine, comprising:

a swabbing member made of an absorbent material provided around a core member for supplying the surface of a mold with a preliminarily impregnated swabbing agent by being rubbed against the surface of the mold;

a multijoint robot having a robotic arm with four or more joints which traverses above a plurality of bottle forming sections for carrying the swabbing member to each one of the positions of said molds and performing an automatic swabbing operation at each section wherein each joint is capable of a pivoting and a rotational movement independent of, and concurrent with, the other joints;

a plurality of motors for separately driving each of the joints of the robotic arm;

a controller for separately controlling the activation of each motor to drive the swabbing member relative to each mold to a position within a mold, to press the swabbing member against the surface of the mold and to move the swabbing member along the surface; and a swabbing agent supply means which operates in combination with the multijoint robot for feeding a swabbing agent to the surface of a mold;

whereby the controller controls an execution of swabbing operation in compliance with a predetermined order for forming actions of each bottle forming sections.

14. A swabbing device for molds of the bottle making machine as claimed in claim 13, wherein said swabbing member is made of cloth or string provided around a core member for absorbing a swabbing agent.

15. A swabbing device for molds of the bottle making machine as claimed in claim 14, wherein said swabbing agent supply means feeds a swabbing agent by bringing the swabbing agent in contact with the outer periphery of the swabbing member in a manner of impregnation.

16. A swabbing device for molds of the bottle making machine as claimed in claim 14, wherein said swabbing agent supply means impregnates a swabbing agent into an impregnated material from within the core material of the swabbing member.

17. A swabbing device for molds of the bottle making machine as claimed in claim 13, wherein the whole body of the multijoint robot is arranged to move in a reciprocating motion in a direction bottle forming sections are aligned, and is stopped at a predetermined swabbing position.

18. A swabbing device for molds of the bottle making machine as claimed in claim 17, wherein said multijoint robot is driven in a reciprocating motion along a straight guide.

19. A swabbing device for molds of the bottle making machine as claimed in claim 17, further comprising:

a position indication provided corresponding to a mold of each bottle forming section;

a detector provided on the side of said multijoint robot for detecting each position indication at a predetermined position opposite to the multijoint robot;

a controller for judging a swabbing position of the multijoint robot against each mold based on the result of a detection made by the detector, and stopping the multijoint robot at the swabbing position corresponding to each mold for performing a swabbing operation.

20. A swabbing device for molds of a bottle making machine, comprising:

a plurality of swabbing members, each member having a different shape and made of an absorbent material provided around a core member for supplying the surface of a mold with a preliminarily impregnated swabbing agent by being rubbed against the surface of the mold;

a multijoint robot with four or more joints which traverses above a plurality of bottle forming sections for carrying the swabbing member to a position of each of the molds and performing an automatic swabbing operation at each section;

a swabbing agent supply means which operates in combination with the multijoint robot for feeding a swabbing agent to the surface of a mold;

a first controller for executing a swabbing operation in compliance with a predetermined order of the bottle forming sections; and a second controller for controlling the multijoint robot to selectively exchange said plurality of swabbing members according to a predetermined standard.

21. A swabbing device for molds of the bottle making machine as claimed in claim 20, wherein said swabbing member is made of cloth or string provided around a core member for absorbing a swabbing agent.

22. A swabbing device for molds of the bottle making machine as claimed in claim 21, wherein said swabbing agent supply means feeds a swabbing agent by bringing the swabbing agent in contact with the outer periphery of the swabbing member in a manner of impregnation.

23. A swabbing device for molds of bottle making machine as claimed in claim 21, wherein said swabbing agent supply means impregnates a swabbing agent into an impregnated material from within the core material of said swabbing member.

24. A swabbing device for molds of the bottle making machine as claimed in claim 20, wherein the whole body of said multijoint robot is arranged to move in a reciprocating motion in a direction the bottle forming sections are aligned, and is stopped at a predetermined swabbing position.

25. A swabbing device for molds of the bottle making machine as claimed in claim 24, wherein said multijoint robot is guided along a straight guide and is driven in a reciprocating motion.

26. A swabbing device for molds of the bottle making machine as claimed in claim 24, further comprising:

a position detector for detecting a position where the multijoint robot is at present; and a third controller for judging a swabbing position of the multijoint robot against each mold based on the result of a detection made by the detector, and stopping the multijoint robot at the swabbing position corresponding to each mold for performing a swabbing operation.

27. An automatic swab lubricating apparatus for a bottle making machine having a plurality of molds with respective cavities comprising:

a support member extending adjacent each of the molds;

an articulated arm cantilevered from the support member and movable along the support member;

a movable swabbing member attached to the articulated arm and of a configuration to extend into and contacting the interior of a mold cavity;

means for providing a fluid lubricant under pressure to the movable swabbing member when it is extended into a mold cavity;

means for sensing the position of the articulated arm and the mold cavities and providing corresponding positional signals; and means for driving the articulated arm and relatively moving the swabbing member relative to the articulated arm in response to the positional signals, whereby the articulated arm can be driven to a position adjacent a mold cavity and the swabbing member can be positioned within and relatively moved to contact an interior of a mold cavity while fluid lubricant is being concurrently delivered to the swabbing member.

28. An automatic swab lubricating apparatus as claimed in claim 27 wherein the swabbing member includes an outer flexible applicator and an internal lubricant supply line connected to the means for providing a fluid lubricant.

29. An automatic swab lubricating apparatus as claimed in claim 28 further including a check valve mounted on the articulated arm and connected to the lubricant supply line to prevent leakage of lubricant when the lubricant is not supplied under pressure to the supply line.

30. An automatic swab lubricating apparatus as claimed in claim 29 wherein each swabbing member includes a detent and the articulated arm has a spring-biased retention member for removably engaging the detent.

31. An automatic swab lubricating apparatus as claimed in claim 27 further including a storage member and a plurality of swabbing members removably mounted on the storage member and control means for automatically directing the means for driving and the articulated arm to remove a swabbing member attached to the articulated arm and mounting it on the storage member and replacing it with a different swabbing member stored on the storage member to accommodate a different configuration of a mold cavity with an appropriately shaped swabbing member.

32. A swabbing device for molds of a bottle making machine, comprising:

a plurality of swabbing members, each member having a different shape for applying a swabbing agent to a mold, and each swabbing member made of an absorbent material provided around a core member for supplying the surface of a mold with the swabbing agent;

a multijoint robot with four or more joints which traverses above a plurality of bottle forming sections for carrying said swabbing member to a position adjacent each of the molds and performing an automatic swabbing operation at each section;

a controller for controlling the multijoint robot to select a swabbing member from the plurality of swabbing members for a swabbing operation at a mold; and a swabbing agent supply means which operates in combination with the multijoint robot for feeding a swabbing agent to the surface of a mold.

33. A swabbing device for molds of a bottle making machine, comprising:

a swabbing member made of an absorbent material provided around a core member for supplying the surface of a mold with a preliminarily impregnated swabbing agent by being rubbed against the surface of the mold;

a multijoint robot with four or more joints which traverses above a plurality of bottle forming sections for carrying the swabbing member to each one of the positions of said molds and performing an automatic swabbing operation at each section, wherein the multijoint robot is arranged to move in a reciprocating motion across the bottle forming section and can be stopped at predetermined positions a position indication provided corresponding to a mold of each bottle forming section;

a detector provided on the side of said multijoint robot for detecting each position indication at a predetermined position opposite to the multijoint robot;

a controller for judging a swabbing position of the multijoint robot against each mold based on the result of a detection made by the detector, and stopping the multijoint robot at the swabbing position corresponding to each mold for performing a swabbing operation; and a swabbing agent supply means which operates in combination with the multijoint robot for feeding a swabbing agent to the surface of a mold.

* * * * *